UNITED STATES PATENT OFFICE.

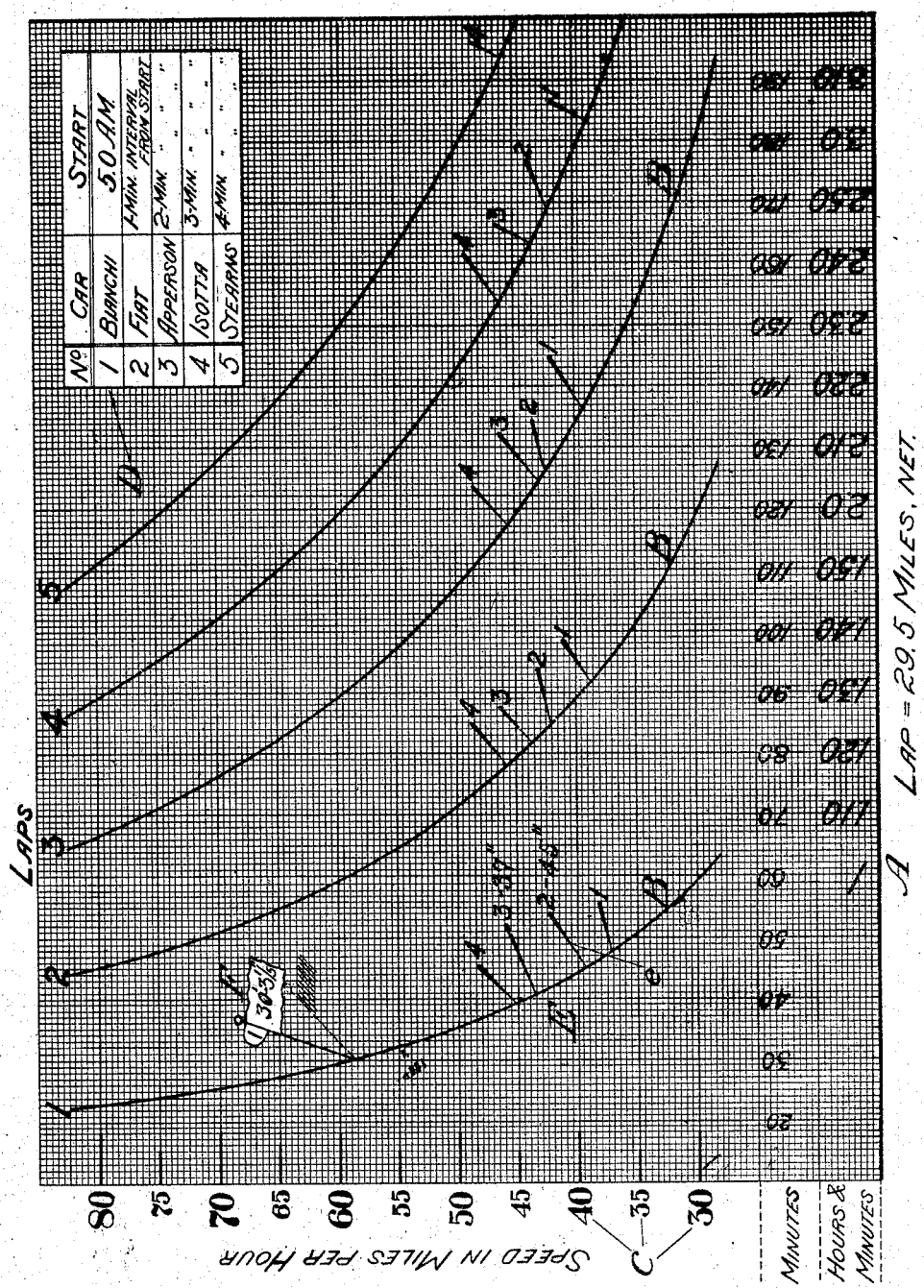

HERMANN FRANCIS CUNTZ, OF HARTFORD, CONNECTICUT.

TALLY-CHART.

1,023,457.   Specification of Letters Patent.   Patented Apr. 16, 1912.

Application filed September 28, 1908. Serial No. 455,005.

*To all whom it may concern:*

Be it known that I, HERMANN FRANCIS CUNTZ, a citizen of the United States, residing at Hartford, in the county of Hartford and State of Connecticut, have invented a certain new and useful Improvement in Tally-Charts, of which the following is a specification.

My invention relates to a system of keeping tally, and a chart therefor. It is particularly applicable in the case of races in which time and distance are elements.

In general my system of keeping tally, or scoring as it is commonly called, comprises a chart upon which appear all the necessary elements and the result for all cases, and upon which the scoring may be effected by locating a definite point to indicate the particular result, as distinguished from scoring or tallying in which the distance or time, or other elements, are entered serially or otherwise, and from which the result must be made by deduction, comparison or estimate.

In particular the form of score chart and the system for which my invention lends itself to great advantage, is in the charting or recording of the results of a race about a course, in which a plurality of laps constitutes the complete race, and in which the standing of the contestants is determined from one point. In illustration of this particular form of application of my invention, I will refer to the accompanying drawing forming a part hereof, in which the figure illustrates a chart which would be applicable to a race, as, for instance, a race of automobiles four times around a given course, or, in other words, four laps. In such a case the relative standing of each contestant at the end of each lap is desired, and also the speed attained by the leader or by each. As in such races the contestants start at different times, the order in which they pass the starting point at the end of each lap does not show their relative order in the race. Therefore a tabulation of hour, minutes and seconds requires a careful scrutiny and comparison each time it is desired to know the standing of any contestant. In that way much time is spent in recording and study of figures, which a spectator would rather devote to really seeing the race.

By the use of my invention in its particular application herein illustrated and described, a spectator or official of the race can jot down a mark as each contestant passes a given point, and the result is a record, which, at a glance, shows the relative standing or order of contestants, and at a glance the speed can be read.

In this particular form of embodiment of my invention, I denote by the horizontal distance on the chart the time elapsed from the beginning of the race, as at A. B represent the lap curves, while the result in speed is represented in the vertical distances C. This I prepare by using the formulæ of distance divided by time, the result being the speed. Applying the formulæ to determine a number of points in the lap curve for each lap, I then draw the curve which represents the speed for any probable elapsed time of the contest, and for the particular distance from the start or length of the lap. Intermediate curves may be drawn to show the standing of racers at given points on the course, in which case the curves are plotted based on the distance from the starting point to the point represented by the curve.

With reference to the drawing, the system of charting consists in noting the time at which a contestant passes the starting point, following horizontally the time column A, which, in this case, is denoted in minutes, and hours and minutes, and interpolating between the vertical lines to the closest approximation to the actual time in seconds and fraction thereof, and then following vertically until such line or interpolated imaginary line intercepts the lap curve B. In the case of the completion of the first lap, curve or lap curve 1 would govern, and correspondingly lap curve 2 after the second lap, curve 3 after the third, etc. In each case the complete elapsed time from the beginning of the race is measured horizontally on the time column A. Having reached the curve, at the intersection a mark is made in any manner desired, although I prefer to draw a line substantially normal to the curve as shown at E, and meeting the curve in a faint line to more accurately indicate the precise point of intersection. While at the opposite end of the normal mark or line may be inserted the number of the contestant. When contestants are very close, the seconds and fractions thereof can be noted.

When the chart is used in a fixed position, as, for instance, on a large scale painted on a board in a form suitable to locate at a grand stand where it can be seen by many, I prefer to use flag-like markers, as illustrated at F. In such case an official timer enters on the flag marker the number of contestant and the elapsed time, and passed to the scorer the flag is tacked firmly into the board at the proper intersection on the respective lap curve.

As indicated at D is a table of the contestants, giving such information on the face of the tally sheet which supplies any required data to complete the record of the contest. The use of marks as E, upon their very insertion in the right position determined by the elapsed time, at once records the relative position of the contestants at the close of each lap.

In contests of the character for which the particular form illustrated is used, it is practice to start the contestants in the race at intervals of, say, one-half minute, one minute or sometimes two minutes. Whether or not this interval is regular, it is only necessary to note in table D the start and the interval from the start of each subsequent starter. With this on the sheet the elapsed time may be immediately determined when the contestant passes the fixed point in the course as on the completion of each lap, and determining the intersection on the lap curve thereupon immediately records the actual elapsed time, irrespective of the time of day. The accuracy will be within a fraction of a minute in the chart herewith illustrated, and gives at a glance the actual relative position of the contestants. If more accuracy is desired, as in the case of a very close race between two of the contestants, the seconds may be jotted down in addition to the racing number of the contestants. Having, however, once noted the accurate elapsed time of two close contestants, the recording lines E may be drawn diverging, and though intersecting the lap line at very nearly the same point, their divergence and the location above or below each other will indicate the standing or sequence in the lap. On the final lap and the completion of the race, for convenience, the time may also be entered after the racing number of the contestant.

After the entry or recording of the position of each contestant, which is recording the elapsed time by the line or other mark on the lap line, the record is complete, but in addition the vertical position of the intersection determines and permits the immediate reading from the chart of the speed of that contestant up to that point in the race. This is done by following horizontally the point of intersection on the lap curve to left, and reading on the speed column C the actual speed, which in the case illustrated is miles per hour. The same method of interpolating between the speed figures in the column is followed as in the case of any graphic and as very generally used by the technical fraternity, when using what is known as section paper. In short, in the use of my invention, making one mark in the proper place and denoted by the contestant's number, at once records and makes readable at a glance all the results desired, as, for instance, the elapsed time, the speed, the order of the racers and the closeness of the contest. A glance to compare the record on different laps, shows at once if each racer is increasing or losing in speed, or if he is running consistently.

The accuracy of scoring or charting will be a personal equation. As a rule individuals keeping tally desire only the relative position of contestants and the approximate speed. For this I have made a chart in convenient size, which involves dimension or a scale that permits as accurate reading as any spectator could well desire, that is speed down to a quarter of a mile, and time down to fifteen or twenty seconds. When used on a score-board, large enough and suitable to be viewed from a grand stand or a press stand, the scale is ample to record with accuracy to any desired limit.

A modified form of my chart may serve simply to read the speed for any one lap, and involves a single lap or distance curve. Such a chart is more compact and may also be used to record the finish of the race by having a time column for the whole race on one edge of the chart, and the time column for single laps on the other edge, both reading onto the same curve.

While I have shown and described a particular embodiment of my tally-chart, my invention is not limited to such specific form, but is capable of numerous modifications, in addition to the necessary changes to suit such specific form to any particular race.

What I claim and desire to secure by Letters Patent is:

1. A record chart for automobile races, or the like, comprising a field sub-divided vertically into graduations denoting speed and divided horizontally by graduations denoting time, a series of preponderating lines representing respectively the laps of the race applied to said graduations in a manner to be primarily visible, means for indicating on each of said lap curves the position of the individual contestants, respectively, based on the elapsed time, whereby the relative position of the contestants in the race is indicated in their regular sequence at the end of each lap by their proximity to one end of the lap lines, and simultaneously a record of speed is instantly readable therefrom.

2. A chart for graphically recording the result of races over a plurality of laps over a given course, comprising a field having relatively faint horizontal lines representing speed in miles per hour, relatively faint vertical lines representing elapsed time, preponderating curves each representing the total distance of the race at the end of the respective laps, means for recording on said field instantly the position of individual contestants, respectively, whereby their relative position with respect to one end of the curved lines indicates at a glance the relative standing in the race, and simultaneously records the speed of the individuals respectively.

Signed this 25th day of September, 1908, at New York.

HERMANN FRANCIS CUNTZ.

Witnesses:
   H. T. CLINTON,
   JAMES W. CARPLES.